US012792855B2

(12) United States Patent
Simpson

(10) Patent No.: US 12,792,855 B2
(45) Date of Patent: *Nov. 10, 2026

(54) SYSTEM AND METHOD FOR EXTRACTING A REGION OF INTEREST FROM A CAPTURED IMAGE OF A MAILPIECE OR PARCEL LABEL

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/303,136

(22) Filed: Aug. 18, 2025

(65) Prior Publication Data

US 2025/0384230 A1 Dec. 18, 2025

Related U.S. Application Data

(63) Continuation of application No. 18/731,064, filed on May 31, 2024, now Pat. No. 12,393,805, which is a
(Continued)

(51) Int. Cl.

*G06K 7/14* (2006.01)
*G06T 7/11* (2017.01)
*G06T 7/13* (2017.01)

(52) U.S. Cl.

CPC ......... *G06K 7/1413* (2013.01); *G06K 7/1417* (2013.01); *G06T 7/11* (2017.01); *G06T 7/13* (2017.01)

(58) Field of Classification Search

CPC . G06K 7/1417; G06V 30/1444; G06V 30/424
(Continued)

(56) References Cited

U.S. PATENT DOCUMENTS 5,120,940 A 6/1992 Willsie
6,634,555 B1 10/2003 Sorrells et al.
(Continued)

FOREIGN PATENT DOCUMENTS

CN 109 784 328 A 5/2019
GB 2388230 A 11/2003
(Continued)

OTHER PUBLICATIONS

Chai et al."Locating and Decoding EAN-13 Barcodes from Images Captured by Digital Cameras",Information, Communications and Signal Processing, 2005 Fifth International Conference on Bangkok, Thailand, pp. 1595-1599. Dec. 6, 2005.
(Continued)

*Primary Examiner* — Toan C Ly
(74) *Attorney, Agent, or Firm* — Knobbe, Martens, Olson & Bear, LLP

(57) ABSTRACT

The present disclosure relates to a system and method for extracting a region of interest from a captured image of an item. The system may include a reader configured to capture an image of an item having a computer readable code positioned thereon. The system may also include a processor in data communication with the reader and configured to generate captured image data, the captured data comprising binary image data and identify a first pixel region representing the computer readable code from the binarized image data. The processor may be further configured to remove a second pixel region other than the first pixel region from the binarized image data and store or process only first binarized image data representing the first pixel region.

19 Claims, 12 Drawing Sheets

Related U.S. Application Data continuation of application No. 18/454,454, filed on Aug. 23, 2023, now Pat. No. 12,282,824, which is a continuation of application No. 17/449,039, filed on Sep. 27, 2021, now Pat. No. 11,775,786.

(60) Provisional application No. 63/085,492, filed on Sep. 30, 2020.

(58) Field of Classification Search
USPC .......................................................... 235/462.1
See application file for complete search history.

(56) References Cited

U.S. PATENT DOCUMENTS

| | | | |
|---|---|---|---|
| 6,837,432 | B2 | 1/2005 | Tsikos et al. |
| 9,213,875 | B1 | 12/2015 | Nadabar et al. |
| 10,346,659 | B1 | 7/2019 | Ahmed et al. |
| 10,734,928 | B1 | 8/2020 | Sood |
| 2002/0196977 | A1 | 12/2002 | Navon |
| 2008/0008379 | A1 | 1/2008 | Andel |
| 2009/0159510 | A1 | 6/2009 | Haushalter |
| 2009/0289121 | A1 | 11/2009 | Maeda et al. |
| 2011/0121069 | A1 | 5/2011 | Lindahl et al. |
| 2011/0222605 | A1 | 9/2011 | Kashiwagi et al. |
| 2011/0244919 | A1 * | 10/2011 | Aller .................... G06V 40/168 382/165 |
| 2012/0256007 | A1 | 10/2012 | Cok |
| 2012/0312878 | A1 | 12/2012 | Choi |
| 2013/0105582 | A1 | 5/2013 | Yates et al. |
| 2014/0347557 | A1 | 11/2014 | Gomita et al. |
| 2015/0054821 | A1 | 2/2015 | Kumar et al. |
| 2018/0232611 | A1 | 8/2018 | Guo |
| 2019/0325183 | A1 | 10/2019 | Tscherepanow et al. |
| 2020/0092470 | A1 | 3/2020 | Tanioka et al. |

FOREIGN PATENT DOCUMENTS

| | | | |
|---|---|---|---|
| JP | H 0793474 | A | 4/1995 |
| WO | WO 2020/091206 | A1 | 5/2020 |

OTHER PUBLICATIONS

International Search Report and Written Opinion dated Aug. 28, 2023, corresponding to International Application No. PCT/US2023/020257.

International Search Report and Written Opinion dated Jan. 20, 2022, in International Application No. PCT/US2021/052208.

International Preliminary Report on Patentability dated Mar. 28, 2023, in International Application No. PCT/US2021/052208.

International Search Report and Written Opinion dated Feb. 23, 2022, in International Application No. PCT/US2021/061650.

Katona et al. "A Novel Method for Accurate and Efficient Barcode Detection with Morphological Operations", 2012 Eighth International Conference on Signal Image Technology and Internet Based Systems, IEEE Computer Society, pp. 307-314. Nov. 25, 2012.

* cited by examiner

10

20

FIG. 2B
25
260
265
250
USPS PRIORITY MAIL®
USPS TRACKING #
0000 0000 0000 0000 0000 00
FOR DOMESTIC USE ONLY
PRIORITY
MAIL
VISIT US
FROM:

30

50

600

620

55

80

850

SYSTEM AND METHOD FOR EXTRACTING A REGION OF INTEREST FROM A CAPTURED IMAGE OF A MAILPIECE OR PARCEL LABEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 18/731,064, filed on May 31, 2024, which is a continuation of U.S. patent application Ser. No. 18/454,454, filed on Aug. 23, 2023, which is a continuation of U.S. patent application Ser. No. 17/449,039, filed on Sep. 27, 2021, which claims priority to and the benefit of Provisional Application No. 63/085,492 filed on Sep. 30, 2020 in the U.S. Patent and Trademark Office, the entire contents of both are incorporated herein by reference.

BACKGROUND

Technical Field

The described technology generally relates to image processing, and in particular to a system and method for extracting a region of interest such as a barcode from a captured image of an item such as a mailpiece or parcel label.

Description of the Related Technology

Items, such as articles of mail (e.g., letters, flats, parcels, and the like), warehouse inventories, or packages are frequently received into a processing facility in volume, and must be sorted into particular groups to facilitate further processes such as, for example, delivery of the item to a specified destination. The particular groups can correspond to destinations or other information identified on the item. Processing items or articles can include reading and processing barcode data placed on the items or articles.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for item processing to extract a region of interest.

One aspect is a system for extracting a region of interest from a captured image of an item, the system comprising: a reader configured to capture an image of an item having a computer readable code positioned thereon; and a processor in data communication with the reader and configured to: generate captured image data of the item, the captured data comprising binary image data; identify a first pixel region representing the computer readable code from the binarized image data; remove a second pixel region other than the first pixel region from the binarized image data; and store or process only first binarized image data representing the first pixel region.

In the above system, the computer readable code comprises a barcode including a plurality of bars. In the above system, in identifying the first pixel region, the processor is configured to: identify a first group of pixels representing a first bar from the binarized image data; identify a second group of pixels representing a second bar from the binarized image data; and continue to identify one or more groups of pixels until an Nth group of pixels indicating an Nth bar is identified. In the above system, the first to Nth groups of pixels have a horizontal pixel number and a vertical pixel number, and wherein the barcode has a horizontal length corresponding to the horizontal pixel number and a vertical length corresponding to the vertical pixel number.

In the above system, the processor is further configured to: determine one or more pixel groups of the first to Nth groups of pixels having an orientation of a major axis thereof greater than or less than a predetermined angle compared to that of the remaining pixel groups of the first to Nth groups of pixels; and remove the one or more pixel groups from the first binarized image data in response to determining the one or more pixel groups. In the above system, the predetermined angle is about 5-10 degrees.

In the above system, the processor is configured to determine the orientation based on an arrangement of binary values in the one or more pixel groups. The above system further comprises: a memory configured to store pixel numbers of each of major axes and minor axes of the plurality of bars of the barcode. In the above system, in identifying the first to Nth groups of pixels, the processor is configured to retrieve the pixel numbers of the major axes and minor axes of the plurality of bars of the barcode and compare the pixel numbers with the binarized image data.

In the above system, each of the first to Nth groups of pixels has the same pixel numbers for the major axes thereof. In the above system, the processor is further configured to remove the second pixel region using an image mask. In the above system, the processor is configured to use edge detection to determine the beginning and ending of pixel values of the computer readable code. In the above system, the computer readable code comprises at least one of the following: an intelligent barcode including an Intelligent Mail® package barcode (IMpb), a UPC barcode, an EAN barcode, a Code39 barcode, a Code 128 barcode, an ITF barcode, a Code 93 barcode, a Codabar barcode, a GS1databar barcode, an MSI Plessey barcode, a QR code, a Datamatrix code, a PDF417 code or an Aztec code.

In the above system, the computer readable code comprises a two dimensional barcode including white spaces and black bars, and wherein in identifying the first pixel region, the processor is configured to: pass the two dimensional barcode through a first filter to fill the white spaces with black bars to generate a modified two dimensional barcode; determine a location of a pixel region representing the two dimensional barcode in the binarized image data; and pass the modified two dimensional barcode through a second filter to restore the white spaces and binarized image data of the two dimensional barcode, wherein the binarized image data of the two dimensional barcode represents the first pixel region. In the above system, the first and second filters respectively comprise first and second convolutional filters inverse to each other.

Another aspect is a method of extracting a region of interest from a captured image of an item, the method comprising: capturing, at a reader, an image of an item having a computer readable code positioned thereon; generating, at a processor, captured image data of the item comprising binary image data; identifying, at the processor, a first pixel region representing the computer readable code from the binarized image data; removing, at the processor, a second pixel region other than the first pixel region from the binarized image data; and storing or processing, at the processor, only first binarized image data representing the first pixel region.

In the above method, the computer readable code comprises a barcode including a plurality of bars. In the above method, the identifying comprises: identifying a first group of pixels representing a first bar from the binarized image data; identifying a second group of pixels representing a second bar from the binarized image data; and continuing to identify one or more groups of pixels until an Nth group of pixels indicating an Nth bar is identified. In the above method, the first to Nth groups of pixels have a horizontal pixel number and a vertical pixel number, and wherein the barcode has a horizontal length corresponding to the horizontal pixel number and a vertical length corresponding to the vertical pixel number.

The above method further comprises: determining, at the processor, one or more pixel groups of the first to Nth groups of pixels having an orientation of a major axis thereof greater than or less than a predetermined angle compared to that of the remaining pixel groups of the first to Nth groups of pixels; and removing, at the processor, the one or more pixel groups from the first binarized image data in response to determining the one or more pixel groups.

Another aspect is a system for extracting a region of interest from a captured image of an item, the system comprising: an imaging device configured to capture an image of an item having a computer readable code thereon; and a processor in data communication with the imaging device and configured to: generate first image data of the item, the captured data comprising binary image data; identify a first pixel region in the binary image data, the first pixel region comprising the computer readable code; remove a second pixel region, the second pixel region comprising the captured image data which is other than the first pixel region; and store second image data, the second image data comprising the first pixel region.

In the above system, the computer readable code comprises a barcode. In the above system, in identifying the first pixel region, the processor is configured to: identify a first group of pixels representing a first bar from the binarized image data; identify a second group of pixels representing a second bar from the binarized image data; and identify an Nth group of pixels indicating an Nth bar is identified. In the above system, the first to Nth groups of pixels each comprise a horizontal pixel number and a vertical pixel number, and wherein the barcode has a horizontal length corresponding to the sum of the horizontal pixel number for each of the first to Nth groups of pixels and a vertical length corresponding to the vertical pixel number.

In the above system, the processor is further configured to: determine one or more pixel groups of the first to Nth groups of pixels having an orientation of a major axis thereof greater than or less than a predetermined angle compared to that of the remaining pixel groups of the first to Nth groups of pixels; and remove the one or more pixel groups from the first binarized image data in response to determining the one or more pixel groups. In the above system, the predetermined angle is about 5 degrees-about 10 degrees. In the above system, the processor is configured to determine the orientation based on an arrangement of binary values in the one or more pixel groups. The above system further comprises: a memory configured to store pixel numbers of each of major axes and minor axes of the plurality of bars of the barcode.

In the above system, in identifying the first to Nth groups of pixels, the processor is configured to retrieve the pixel numbers of the major axes and minor axes of the plurality of bars of the barcode and compare the pixel numbers with the binarized image data. In the above system, the processor is further configured to remove the second pixel region using an image mask. In the above system, the processor is configured to use edge detection to determine the beginning and ending pixel values of the computer readable code.

In the above system, the computer readable code comprises a two dimensional barcode including white spaces and black spaces, and wherein in identifying the first pixel region, the processor is configured to: pass the two dimensional barcode through a first filter to fill the white spaces to generate a modified two dimensional barcode; determine a location of a pixel region representing the two dimensional barcode in the binarized image data; and pass the modified two dimensional barcode through a second filter to restore the white spaces and binarized image data of the two dimensional barcode, wherein the binarized image data of the two dimensional barcode represents the first pixel region. In the above system, the first and second filters respectively comprise first and second convolutional filters inverse to each other.

Another aspect is a method of extracting a region of interest from a captured image of an item, the method comprising: capturing, in an imaging device, an image of an item having a computer readable code positioned thereon; generating, at a processor, first image data of the item comprising binary image data; identifying, at the processor, a first pixel region representing the computer readable code from the binarized image data; removing, at the processor, a second pixel region, the second pixel region comprising the captured image data which is other than the first pixel region; and storing second image data, the second image data comprising the first pixel region.

In the above method, the computer readable code comprises a barcode including a plurality of bars. In the above method, the identifying comprises: identifying a first group of pixels representing a first bar from the binarized image data; identifying a second group of pixels representing a second bar from the binarized image data; and continuing to identify one or more groups of pixels until an Nth group of pixels indicating an Nth bar is identified, where N is a natural number greater than 1. In the above method, the first to Nth groups of pixels have a horizontal pixel number and a vertical pixel number, and wherein the barcode has a horizontal length corresponding to the horizontal pixel number and a vertical length corresponding to the vertical pixel number.

The above method further comprises: determining, at the processor, one or more pixel groups of the first to Nth groups of pixels having an orientation of a major axis thereof greater than or less than a predetermined angle compared to that of the remaining pixel groups of the first to Nth groups of pixels; and removing, at the processor, the one or more pixel groups from the first binarized image data in response to determining the one or more pixel groups.

Another aspect is a non-transitory computer readable medium storing instructions, when executed by one or more processors, configured to perform a method of extracting a region of interest from a captured image of an item, the method comprising: capturing, in an imaging device, an image of an item having a computer readable code positioned thereon; generating, at a processor, captured image data of the item comprising binary image data; identifying, at the processor, a first pixel region representing the computer readable code from the binarized image data; removing, at the processor, a second pixel region, the second pixel region comprising the captured image data which is other than the first pixel region; and storing second image data, the second image data comprising the first pixel region.

In the above medium, the method further comprises: determining, at the processor, one or more pixel groups of the first to Nth groups of pixels having an orientation of a major axis thereof greater than or less than a predetermined angle compared to that of the remaining pixel groups of the first to Nth groups of pixels, where N is a natural number greater than 1; and removing, at the processor, the one or more pixel groups from the first binarized image data in response to determining the one or more pixel groups.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system for extracting a region of interest from a captured image of an item. Furthermore, any aspect of a system for extracting a region of interest from a captured image of an item can be configured to perform a method of another aspect. Furthermore, any aspect of a method can comprise another aspect of a system for extracting a region of interest from a captured image of an item. Moreover, any aspect of a system for extracting a region of interest from a captured image of an item can be configured to perform a method of another aspect.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
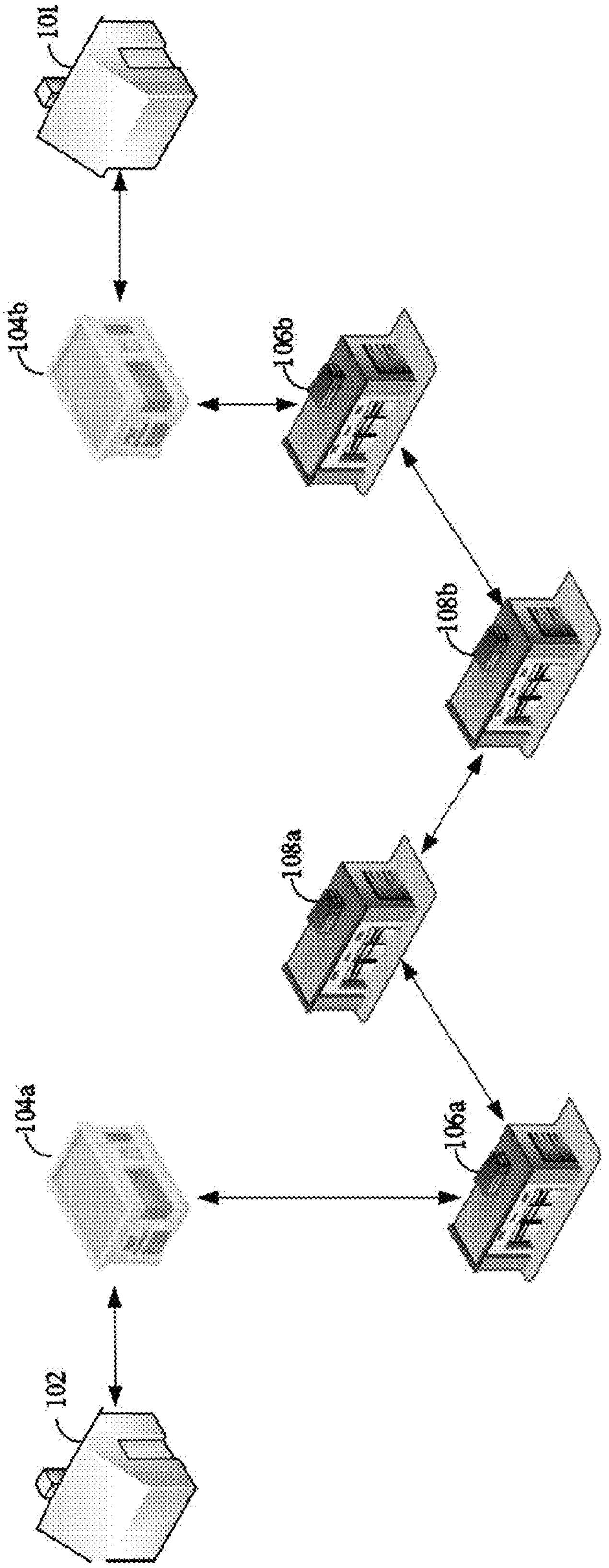
FIG. 1 is a diagram of an exemplary distribution system or network used to distribute items between shippers and recipients.

Provided herein are various embodiments of systems and methods for image processing including, for example, a system and method for extracting a region of interest (ROI) from a captured image of an item such as a mailpiece or parcel label. The ROI can be the area or portion of an item or of an image which contains a computer readable code, such as a barcode on a distribution item. It can be advantageous to identify an ROI in a captured image of an item. With the ROI, or location of the computer readable code within an image identified, a barcode decoding program need not analyze the entire image, but only the portion of the image where the barcode is located. In some embodiments, optical character recognition (OCR) processes have been used to read an image, and then the results of the OCR process is used in a decoding process to read a code. The OCR process can be time and resource intensive. By identifying the ROI in an image or on an item where the computer readable code is located, an entire image of an item need not be analyzed in order to read a computer readable code, interpret an image, etc. The speed, efficiency, and/or the functionality of computing devices in a distribution network such as an item processing system is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. The term "item" may also include a label thereon. In this disclosure, the item may be used to cover a label or may also be interchangeably used with respect to a label. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

An item distribution system or distribution network, such as the United States Postal Service (USPS) or other shipping or item delivery service, logistics service, or other entity may process and/or deliver items, such as letters, flats, parcels, packages, and bulky items to a plurality of delivery points or destinations. The USPS will be used in the described technology to describe some exemplary embodiments, but the described technology is not limited thereto. When referencing generically to any of the services listed above or any item distribution service in addition to those listed above, the phrase "item distribution service," "delivery service," or "distribution system" will be used to indicate such generalities. The terms mail or mailpiece may be used to illustrate exemplary embodiments, but these terms are not intended to be limiting.

In an exemplary aspect described herein, the systems and methods described herein can efficiently extract and process an ROI from binarized image data of a captured image of an item so that the functionality of computing devices such as in an item processing system, such as a sorter, a piece of mail processing equipment, etc., can be significantly improved.

FIG. 1 is a diagram of an exemplary distribution network 10 (to be interchangeably used with a distribution system) that can be used to distribute items between shippers 102 and recipients 101. The distribution network 10 may be employed by an item delivery service to distribute items received and to be delivered across a geographic area. The distribution network 10 shows various distribution points or facilities. In some embodiments, the distribution network 10 may include more or fewer distribution points or facilities than shown in distribution network 10. For example, the distribution network 10 includes unit delivery facilities 104*a* and 104*b* (e.g., post offices or drop-off locations). The distribution network 10 may also include semi-regional facilities 106*a* and 106*b* (e.g., sectional center facilities) and regional facilities 108*a* and 108*b* (e.g., network distribution centers or distribution hubs).

The unit delivery facilities 104*a* and 104*b* may correspond to a facility that receives and delivers items destined to recipients within a given geographic area. Customer service supervisors, carriers and clerks may work in the unit delivery facilities 104*a* and 104*b*. In some embodiments, the unit delivery facilities 104*a* and 104*b* may also sort items before delivery. While customer service supervisors generally work in the unit delivery facilities 104*a* and 104*b*, mail processing supervisors and operators may also work in the unit delivery facilities 104*a* and 104*b*, for example, when the unit delivery facilities 104*a* and 104*b* have the capability to sort items before delivery. Carriers may pick up items from the unit delivery facility 104*b* and deliver the items to the recipients 101. In some embodiments, carriers may also pick up items from the shippers 102 and drop them off at the unit delivery facility 104*a*. Truck drivers may move items between the unit delivery facilities 104*a* and 104*b*, and the semi-regional facilities 106*a* and 106*b*. Truck drivers may also move items between the semi-regional facilities 106*a* and 106*b*, and the regional facilities 108*a* and 108*b*.

In the case of the USPS, the unit delivery facilities 104*a* and 104*b* may be associated with a region covered by a ZIP Code™ (a trademark of the USPS). In these embodiments, the unit delivery facilities 104*a* and 104*b* may receive items from the semi-regional facility 106*a* that serves it. These items received from the semi-regional facilities 106*a* and 106*b* may be delivered by the unit delivery facilities 104*a* and 104*b* (e.g., via a mail carrier route, etc.) to the appropriate destination within its covered geographic area. Accordingly, as discussed above, the unit delivery facilities 104*a* and 104*b* may also sort and stage the items intended for delivery to destinations/recipients within the delivery unit's coverage area.

The unit delivery facilities 104*a* and 104*b* may also serve to induct items into the distribution network 10. When serving as an intake facility, items that are inducted at the unit delivery facilities 104*a*, 104*b* into the distribution network 10 may be sent to the semi-regional facilities 106*a* and 106*b*. In some embodiments, the unit delivery facilities 104*a* and 104*b* may receive items from local shippers, from semi-regional facilities 106*a* and 106*b*, or regional facilities 108*a* and 108*b*. While the delivery unit 104*a* is shown as the intake facility, any of the semi-regional and regional facilities 106*a* and 106*b*, and 108*a* and 108*b*, respectively, or other facilities not shown, may serve as the intake facility.

The semi-regional facilities 106*a* and 106*b* may receive and distribute items between multiple unit delivery facilities 104*a* and 104*b* and the associated regional facilities 108*a* and 108*b*. In the case of the USPS, the semi-regional facilities 106*a* and 106*b* may each be associated with a geographic region covered by the first three numbers of a ZIP code. The semi-regional facility 106*a* may serve as a processing and distribution center for the respective multiple unit delivery facilities 104*a* and 104*b* within its respective geographic areas. In some embodiments, the semi-regional facility 106*a* may receive items from the regional facility 108*a* for distribution to its respective delivery unit 104*a*. In some embodiments, the semi-regional facility 106*a* may receive items from its delivery unit 104*a*, for distribution to other delivery units 104*b* or the regional facility 108*a*. Mail processing supervisors may work with operators in the semi-regional facilities 106*a* and 106*b*.

The regional facilities 108*a* and 108*b* may receive and distribute items between multiple semi-regional facilities 106*a* and 106*b* and other regional facilities. In the case of the USPS, the regional facility 108*a* may be associated with a region covered by a state or a group of states, etc. The regional facilities 108*a* and 108*b* may serve as processing and distribution centers for the respective multiple semi-regional facilities 106*a* and 106*b* within their respective geographic areas. In some embodiments, the regional facility 108*a* may receive items from the semi-regional facility 106*a* for distribution to another semi-regional facility 106*b* that the regional facility 108*a* serves. In some embodiments, the regional facility 108*a* may receive items from its semi-regional facilities 106*a* and 106*b* for distribution to other regional facilities, e.g., the regional facility 108*b*. Mail processing supervisors may also work with operators in the regional facilities 108*a* and 108*b*.

When the item enters the distribution network 10 at the intake facility (e.g., regardless of delivery unit 104*a*, semi-regional facility 106*a*, and regional facility 108*a*), the item may be scanned, routed according to intended destination, and tracked through all sortation and distribution steps through which the item may pass. In some embodiments, such tracking may be individual to the item or be aggregate for volumes of items. The tracking may occur until the item is delivered to its destined recipient or until the item leaves a delivery unit 104*b* for delivery to its destined recipient.

In some embodiments, the distribution network 10, as shown, may be a national distribution network 10 that includes multiple regional facilities 108*a* and 108*b*, multiple semi-regional facilities 106*a* and 106*b*, and multiple unit delivery facilities 104*a* and 104*b*, each having a defined coverage area, such as a geographic area and designated to receive and/or delivery items to/from recipients and senders in the geographic area.

As described herein, the distribution network 10 employed may comprise numerous pieces of mail processing equipment located in various facilities and at each level within the distribution network 10 (described and undescribed) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment identify delivery point information that is located on the items being processed and reference stored information associated with the identified delivery point information to assist in the sorting and routing of the item.

A processing facility can use automated processing equipment to sort items. Where the distribution network 10 is USPS, every day a processing facility receives a very high volume of items, such as letters and flats, which must be sorted and sequenced for delivery. Sorting and sequencing may be accomplished using automated sorting equipment which can scan, read, or otherwise interpret a destination end point from each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the OCR'd address. In some embodiments, the automated sorting equipment can apply a computer readable code that encodes the delivery end point and may print or spray the computer readable code onto the item. In some embodiments, the processing facility uses sorting/sequencing apparatuses which can process about 30,000 items per hour. A typical USPS processing facility may also serve about 200 or more delivery routes, each with multiple delivery end points.

An image or an item or a label has historically been identified using time and resource intensive methods such as OCR. Reading computer readable identifiers using OCR processes can be time consuming and requires a large memory space and more processor resources for processing OCR images. Various embodiments described herein provide a system and method for extracting or detecting an ROI, such as a barcode from an image or image data, such as binarized image data, of a captured image of a mailpiece or parcel label so that ROI can be more efficiently detected or extracted. Various items or labels including barcodes will be described.

Although certain types of barcodes are described in this disclosure, various embodiments can be applied to other types of barcodes including, but not limited to, one-dimensional barcode types (e.g., UPC barcode, EAN barcode, Code39 barcode, Code 128 barcode, ITF barcode, Code 93 barcode, Codabar barcode, GS1databar barcode and MSI Plessey barcode) and two-dimensional barcodes (e.g., QR code, Datamatrix code, PDF417 code and Aztec code). Furthermore, although various embodiments are described with reference to an item barcode that is placed on a mail or an item for delivery, the present disclosure is not limited thereto and can be applied to non-mail barcodes (e.g., barcodes placed on products for sale, exhibit, or advertisement, etc.). Moreover, although various embodiments are described with reference to mail barcodes for USPS, the present disclosure is not limited thereto and can be used by other entities that make or ship products containing barcodes.

Figure 2A:
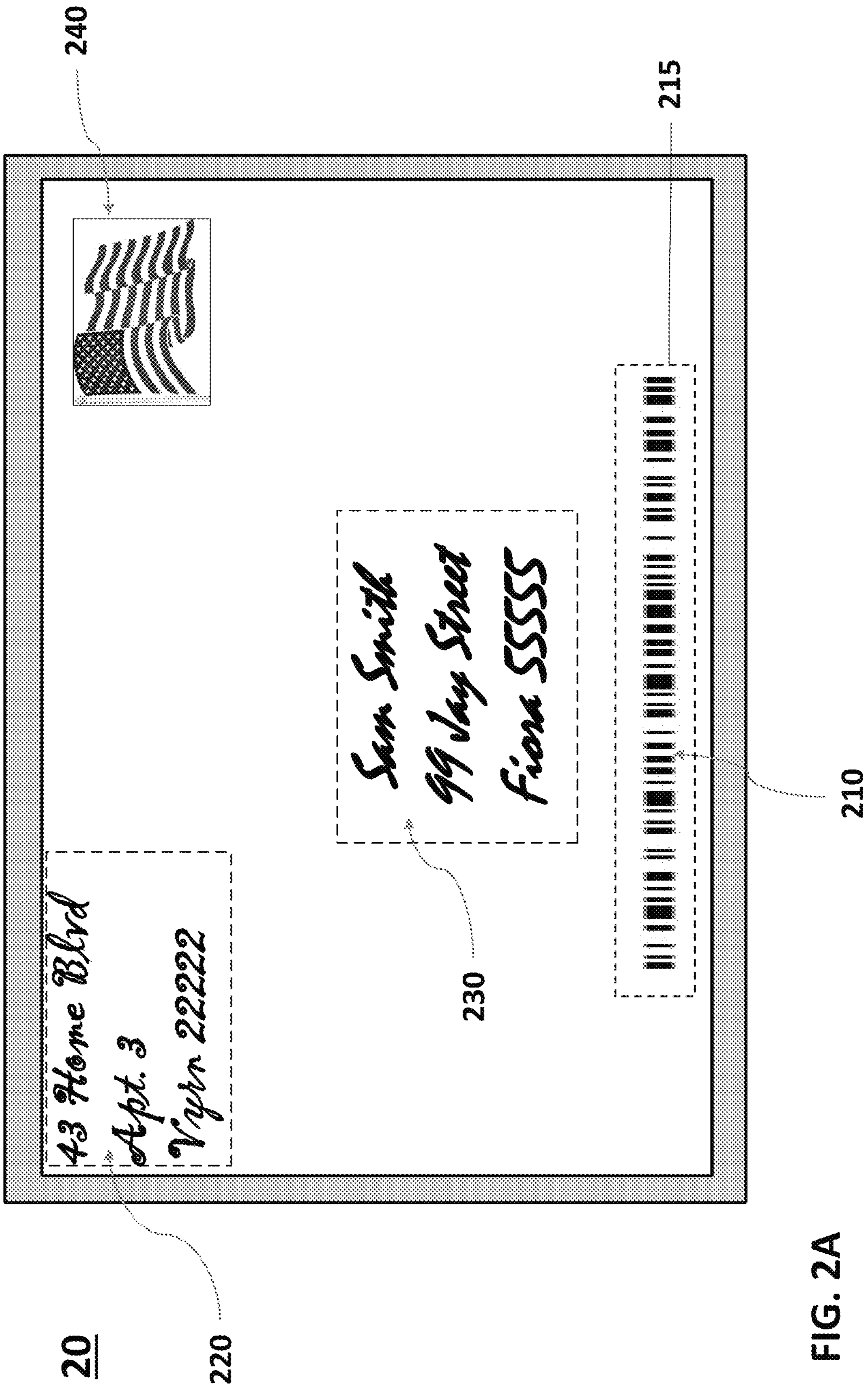
FIG. 2A illustrates an example of an item that contains a barcode according to some embodiments.

FIG. 2A illustrates an example image showing an item 20 that contains a barcode 210 according to some embodiments. The item 20 may additionally include a sender section 220, a recipient section 230 and a postage section 240. The item 20 shown in FIG. 2A is merely an example item, and certain elements may be modified or removed, and/or other elements may be added. For example, although the item 20 of FIG. 2A contains only one barcode, it can also include two or more barcodes depending on the embodiments. Furthermore, although FIG. 2A shows a letter type item, other types of items, such as parcels, flats, and the like can also be used. The item 20 may be processed by the system shown in FIG. 3 or FIG. 4.

The barcode 210 may include an Intelligent Mail® package barcode (IMpb). The IMpb is a barcode that can be read by automated parcel processing equipment and scanning devices, and includes a data string that generally follows the GS1-128 specification. The IMpb may include a variable length format that is determined by the elements selected by the sender, and supply tracking and routing data for packages and extra service applications. The IMpb may be used on commercial packages, and on other items of customers requesting extra services. The barcode 210 may also include other types of computer readable codes described above. An ROI 215 is the area of the image of the item which includes the barcode 210. Systems and processes described herein can identify the ROI 215 in the image of the item 20. FIG. 2A shows an example ROI area 215 having a rectangular shape, the present disclosure is not limited thereto, and other shape (e.g., elliptic, square, circular, etc.) can also be used as long as the barcode 210 or other information in the item 20 (e.g., the sender region 220, the recipient region 230, or the postage region 240) is at least partially included in the ROI area.

Figure 2B:
FIG. 2B illustrates an example image showing a label that contains barcodes according to some embodiments.

FIG. 2B illustrates an example image of an item having a label 25 thereon that contains barcodes 250 and 260 according to some embodiments. The label 25 shown in FIG. 2B is merely an example label, and certain elements may be modified or removed, and/or other elements may be added. For example, although the label 25 of FIG. 2B contains two barcodes, it can also include a single barcode or three or more barcodes depending on the embodiments. For example, barcode 250 can be a UPC or other similar code that does not uniquely identify an item. An ROI identified which includes a UPC can be ignored or discounted by the sorting or item processing systems described herein. An ROI 265 is an area surrounding the barcode 260. The label 25 may be processed by the system shown in FIG. 3 or 4. FIG. 2B shows an example ROI area 265 having a rectangular shape, the present disclosure is not limited thereto, and other shape (e.g., elliptic, square, circular, etc.) can also be used as long as the barcode 210 or other information in the item 25 is at least partially included in the ROI area.

The label 25 may be a printed label and include sorting, processing, and routing information such as recipient mailing address, sender address, class of service, tracking number, postage payment, etc. In some embodiments, a region of interest of the label 25 may include a return address region, recipient address region, barcode region, or the like. In some embodiments, the region of interest may include other information or region in the label 25.

Figure 3:
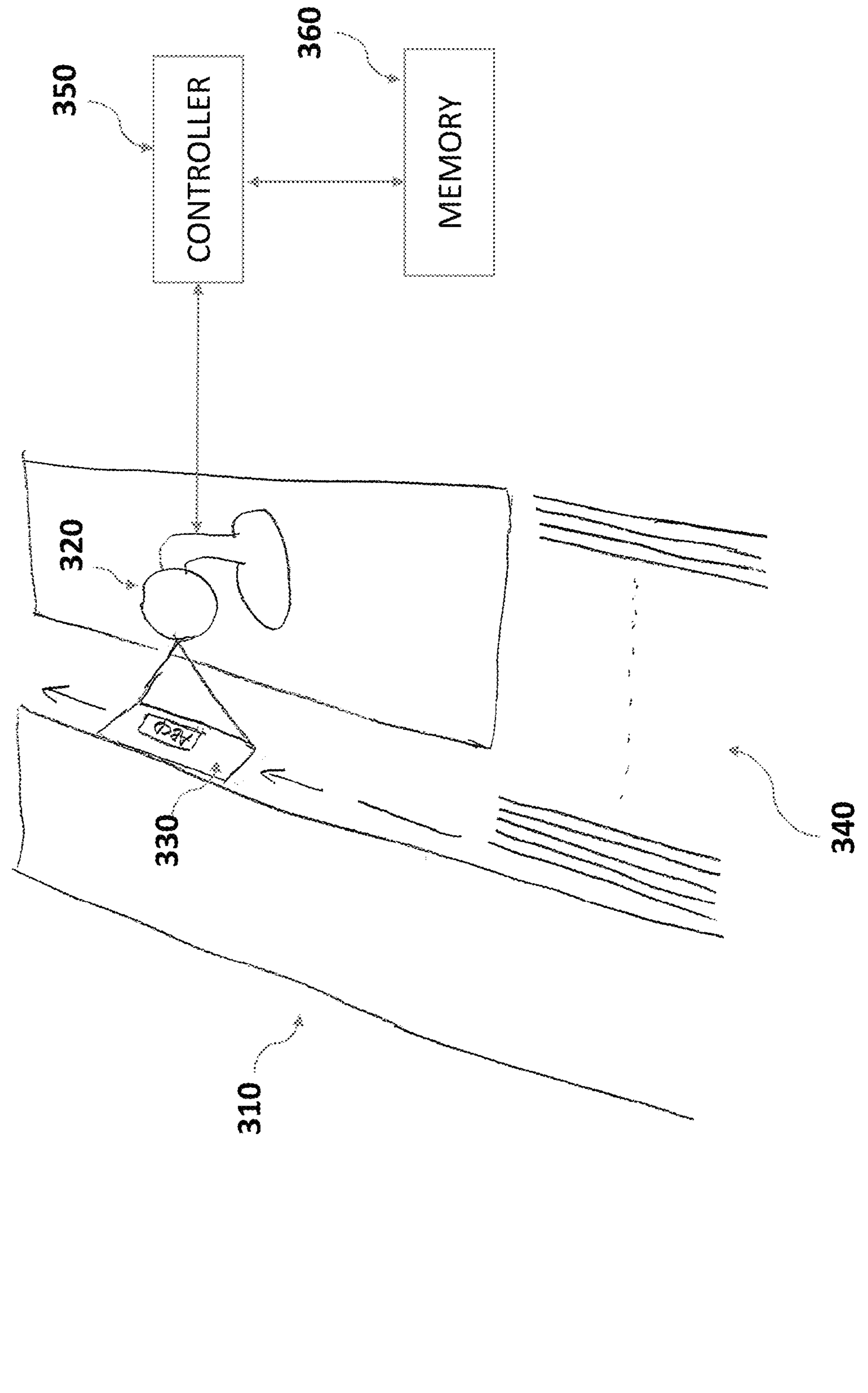
FIG. 3 illustrates an item processing system for extracting a region of interest from a captured image of an item according to some embodiments.

FIG. 3 illustrates an item processing system 30 for processing items such as flat items containing one or more barcodes according to some embodiments. The item processing system 30 may include processing equipment 310, an optical scanner (or a reader) 320, a controller 350 and a memory 360. The item processing system 30 shown in FIG. 3 is merely an example processing system, and certain elements may be modified or removed, and/or other elements or equipment may be added. Although only one optical scanner is shown in FIG. 3, two or more optical scanners can be provided depending on the embodiment.

The processing equipment 310 may include an automated letter sorting machine used for letter-size items that have a computer readable code thereon. The processing equipment 310 may include a conveyor belt (not shown) that moves items from one location to another. Although FIG. 3 shows that the imaging device 320 scans letters or flat items being conveyed by the processing equipment 310, the imaging device 320 can also scan items such as parcels, residual mail, and the like.

The processing equipment 310 may automatically sort items 340 by conveying each of them past an imaging device 320 which captures an image of an item 330 that is being conveyed. The imaging device 320 may capture an entirety or a portion of one side of the item 330 facing the scanner 320. The imaging device 320 may capture information relevant to processing and/or delivery such as names and addresses of senders and recipients, postage and barcodes, etc. The barcodes may include an IMpb or other barcodes described above. The imaging device 320 can be a camera, a scanner, a laser device, or other type of imaging device. The imaging device 320 can output a digital image in color, grayscale, black and white, or binarized data. In some embodiments, the imaging device 320 can capture an image, and can convert the image to binarized data or to another data format. In some embodiments, the conversion to binarized data can occur in another component of a system having an imaging device therein.

In some embodiments, the captured image may include one or more of the images 20 and 25 shown in FIGS. 2A and 2B. In some embodiments, the captured image may include only barcode portions 210, 250 or 260 shown in FIGS. 2A and 2B.

The imaging device 320 may continuously and separately capture images of items being transported in front of the scanner 320. In some embodiments, the imaging device 320 or a connected processor may convert the captured images into digital data, such as binarized image data. In some embodiments, the imaging device 320 may send the captured images to the controller 350 so that the controller 350 may convert the received captured images into binarized image data. In some embodiments, the controller 350 may receive color, grayscale, or black and white image data. The controller 350 can convert the color or grayscale image to a black and white image, and then can convert the image to binarized image data.

In some embodiments, the captured images or digital data thereof may be stored in the memory 360. In some embodiments, the captured images or digital data thereof may be stored in a memory of the scanner 320 or a memory of the controller 350. The imaging device 320 may be connected to the controller 350 either by wire or wirelessly. In some embodiments, the captured images or digital data thereof may be stored in a network memory such as a cloud or other device separately located from the elements 320, 350 and 360. The captured images or digital data thereof may also be transmitted to a receiving device via a communication network (wired or wireless). The digital data may be binarized image data. For example, "0" represents a white pixel and "1" represents a black pixel, or vice versa. Hereinafter, for the purpose of convenience, binarized image data will be described as an example of digital data.

In some embodiments, at least one of the scanner 320 or the controller 350 may read and process a captured image of an item or a label to extract a region of interest including a code or indicia, such as a barcode placed on the item. For example, at least one of the scanner 320 or the controller 350 may identify and process binarized image data of the captured image of the item so as to extract a region of interest which surrounds or includes a barcode. At least one of the scanner 320 or the controller 350 may remove pixel data other than the binarized image data corresponding to the extracted region of interest and only process the remaining binarized image data.

Figure 4:
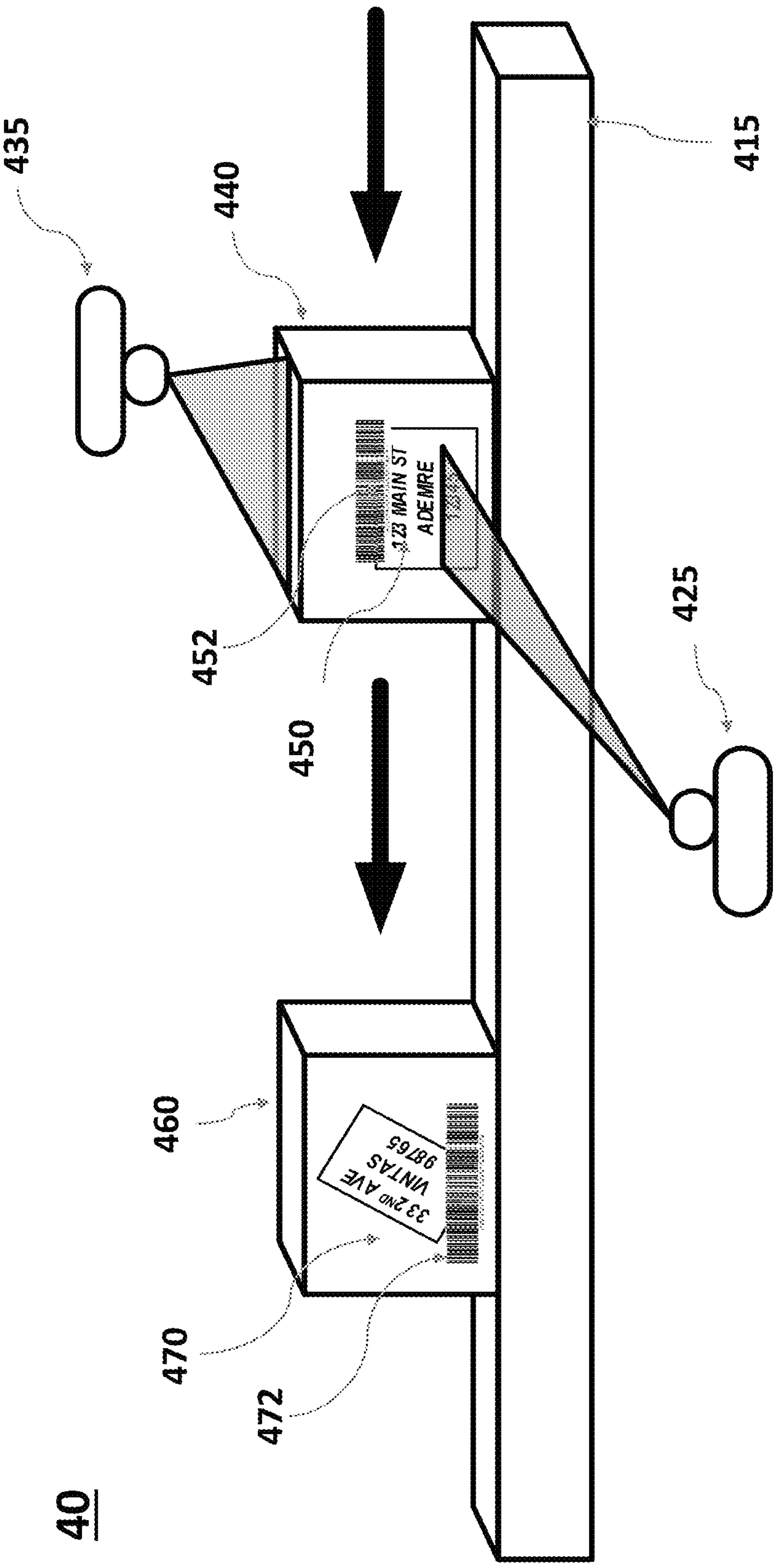
FIG. 4 illustrates another item processing system for extracting a region of interest from a captured image of an item according to some embodiments.

FIG. 4 illustrates another item processing system 40 for processing items such as parcel items containing one or more barcodes according to some embodiments. The item processing system 40 may include a conveyor 415, a front scanner 425 and an upper scanner 435, or may comprise either a front scanner 425 or an upper scanner 435. The position of the scanners 425 and 435 may be altered or changed without departing from the scope of the present disclosure. The conveyor 415 conveys parcels including a parcel 440 and a parcel 460. The front scanner 425 may scan a label 450 of the parcel 440 containing a barcode 452 and disposed on the front side of the parcel 440. The front scanner 425 may also scan a label 470 of the parcel 460 containing a barcode 472 and disposed on the front side of the parcel 460. The upper scanner 435 may scan a label (not shown) containing a barcode and disposed on the top surface of the parcel 440 or 460. For the purpose of convenience, a controller and a memory are omitted in FIG. 4.

Figure 5:
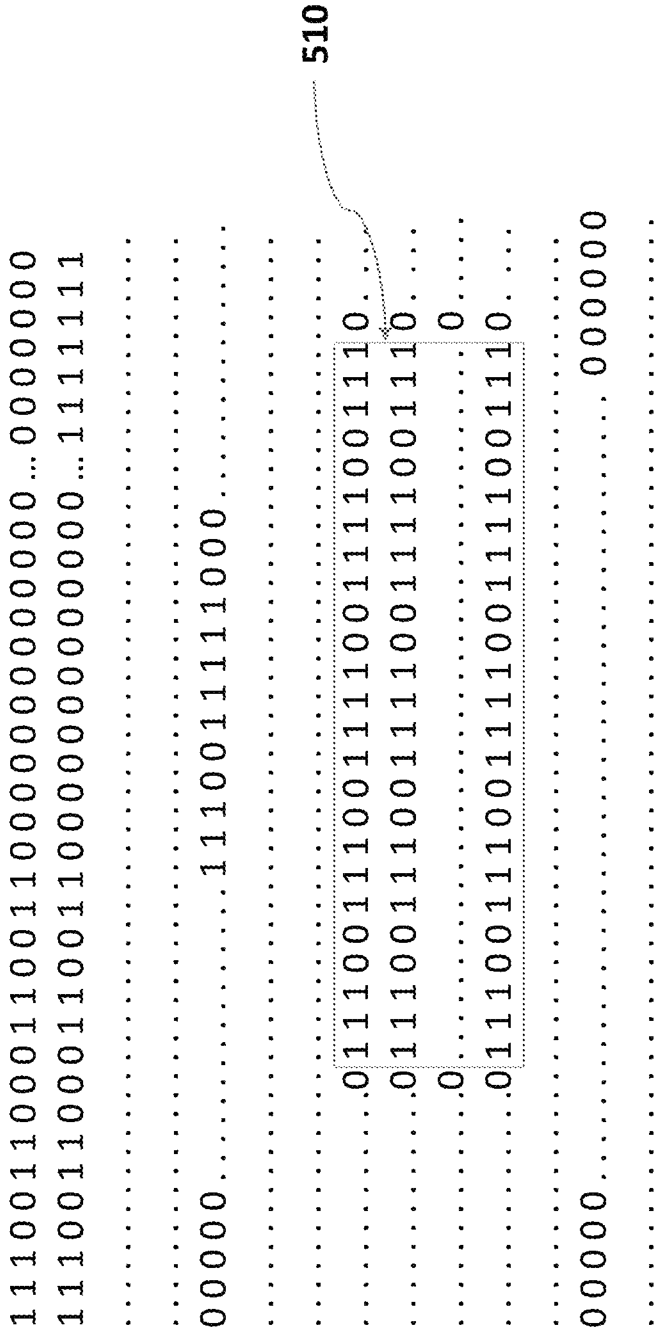
FIG. 5 shows example binarized image data representing a captured image of an item or a label according to some embodiments.

FIG. 5 shows example binarized image data 50 representing a captured image of an item or a label according to some embodiments. The example set of binarized image data 50 may represent a label such as a label 20 shown in FIG. 2A. The binarized image data 50 may include a combination of a white pixel and a black pixel. The white pixel may be represented by "0" and the black pixel may be represented by "1." In FIG. 5, dots can represent either zeros or ones. In the case of a letter or other mailpiece types, a majority of pixels in an image can be white such that the dots depicted are more likely to be white pixels rather than black pixels, or the image of the item may depict artifacts in the image or stray markings on the label such that any black pixels, except for where there is an address, code, stamp, etc., are likely to be randomly distributed through the image. The black pixel may represent a black image, text, handwritten characters, scribbling, and/or bars, and pixel value "0" may represent a background, white space in an image, and space between adjacent bars. FIG. 5 is merely an example set of binarized image data and other configurations of binarized image data may also be used. Each image will have a different set of binarized image data corresponding to the image captured of the item.

The systems and processes described herein can identify in the binarized image data 50 a set of pixel values 510 representing a region of interest. The set of pixel values 510 corresponds to a computer readable code. In some embodiments, the extracted region of interest may include a barcode having a dimension of horizontal length and a vertical length. In these embodiments, the set of pixel values 510 may have a horizontal pixel number corresponding to the horizontal length of the barcode and a vertical pixel number corresponding to the vertical length of the barcode. In some embodiments, the binarized image data 50 may have predetermined horizontal and vertical pixel numbers. The memory 360 may store pixel number information for the binarized image data 50 and the pixel set 510. The memory 360 may also store a ratio of the horizontal and vertical pixel numbers of the binarized image data 50 to those of the pixel set 510. In some embodiments, when the set of pixel values 510 representing the computer readable code is identified, the location of the set of pixel values 510 can be compared to or combined with the image data to act as a mask or filter, and only the image data in the location of the image corresponding to the set of pixel values 510 can be passed to a barcode parser or decoder for reading the computer readable code. In some embodiments, the computer readable code can be parsed or decoded from the binarized image data in the location of the identified ROI.

Figure 6:
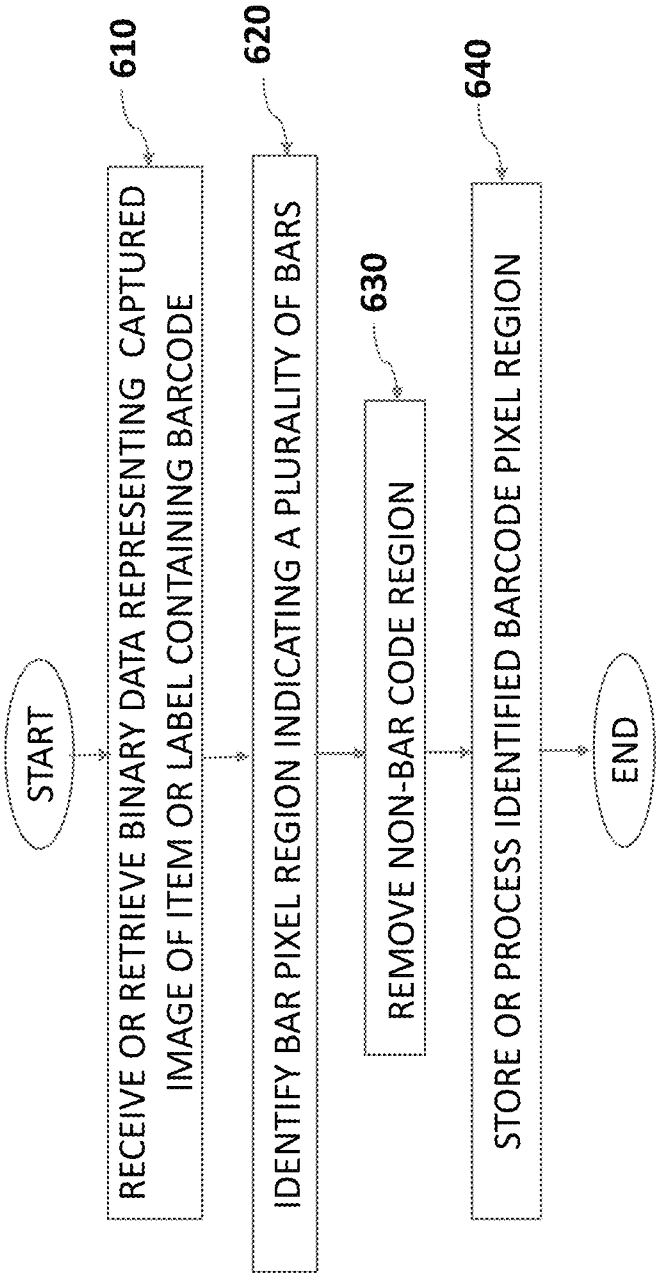
FIG. 6 is a process flow diagram of a method for extracting a region of interest from a captured image of an item or a label according to some embodiments.

FIG. 6 is a process flow diagram 600 of a method for extracting a region of interest from a captured image of an item or a label according to some embodiments. In some embodiments, the process flow diagram 600 may be performed by at least one of the optical scanner (320/425/435) or the controller 350. In some embodiments, the process flow diagram 600 may be performed by another computing device separate from and/or in data communication with at least one of the optical scanner (320/425/435) or the controller 350. For the purpose of convenience, the embodiments of FIGS. 5 and 6 will be described based on the controller 350 performing the process flow diagram 600. Although the process flow diagram 600 is described herein with reference to a particular order, in various embodiments, states herein may be performed in a different order, or omitted, and additional states may be added. This may apply to the process flow diagrams 620 and 850 shown in FIGS. 7 and 10. A region of interest may include return address region, recipient address region, barcode region, or the like. For the purpose of convenience, the description will be provided based on the region of interest being a barcode region provided on an item or a label.

Referring to FIG. 6, in state 610, the controller 350 may receive or retrieve binarized image data representing a captured image of an item or a label containing a barcode. The received or retrieved binarized image data may include the binarized image data 50 shown in FIG. 5. Although the disclosure here uses 1D barcodes as an example, the systems and processes described herein can be used for 2D barcodes and other types of computer readable codes. In some embodiments, the controller 350 may receive binarized image data from one of the scanners (320, 425 and 435). In these embodiments, the scanners (320, 425 and 435) may capture an image of an item and convert the captured image into binarized image data. In some embodiments, the controller 350 may receive the captured image from the scanners (320, 425 and 435), convert the image data into binarized data and store in the memory 360. In these embodiments, the controller 350 may retrieve the binarized image data from the memory 360.

In state 620, the controller 350 may identify a bar pixel region (or a barcode region such as the barcode region 510) including a plurality of bars from the binarized image data 50. The state 620 will be described in more detail with reference to FIG. 7. A barcode includes a plurality of bars. Each bar has a major axis (or a vertically extending height) and a minor axis (or a horizontally extending width generally (but not always) less than the height). Barcode bars may have different or same widths. For example, the widths of at least some bars may be different from those of other bars. In some barcodes, bars can have the same width, and may have various heights, such as in a 4 state barcode. Each barcode may have a unique arrangement of bars and spaces so as to contain a unique set of information associated with an item itself, item delivery and/or data processing, etc. In some embodiments, the controller 350 can identify in the image data, such as the binarized image data, a vertical line of pixels all having a "1" value, or being a black pixel, or plurality of vertical pixels having a "1" value. The plurality of vertical lines can be the bounds, such as the starting point or ending points of the ROI where the computer readable code. In some embodiments, the controller 350 may perform an edge detection operation to determine the beginning and ending of the barcode region 510 in the binarized image data 50 of FIG. 5.

In the binarized image data, the barcode may be represented as a certain number of horizontal pixels for different widths, and a certain different number of vertical pixels for the heights. In one barcode, for example, the height, or number of pixels for each of the bars may be the same or nearly the same, whereas the number of pixels in the width can vary depending on the width of the bars and spaces in the barcode. Depending on the type of a barcode, the pixel numbers may be different. For example, a barcode having a particular format has particular sizes of the major axis and minor axis. Another barcode having another different format has different sizes of the major axis and minor axis. The major axes of bars may have certain numbers of pixels which are generally the same in the bars of a given barcode. The minor axes of bars may have a certain range of pixel numbers at least some of which are different from those of the other bars. Although the major axes are generally the same in the bars of the same barcode, some of the minor axes can be different. These different minor axes may have a particular range on a particular barcode. These ranges may be different depending on the barcodes. The memory 360 may store information including barcode types, barcode formats, pixel numbers for major axes and a range of pixel numbers for the minor axes. Although not shown in FIG. 6, the process flow diagram 600 may additionally include a state in which the controller 350 may determine a type of a barcode from the binarized image data received or retrieved in state 610. Once the type of a barcode is determined, the controller 350 may determine a barcode region based on stored particular pixel numbers for major axes, a range of pixel numbers for minor axes, and a range of pixel numbers for the entire width of the barcode, etc.

To identify the ROI in the barcode, or to identify the pixel region of the barcode, the controller 350 or other processor can process the binarized image data of an image, such as that shown in FIG. 5. The controller 350 identifies pixel groupings which have the same value, that is, either groups of ones or zeros. The controller 350 can identify a plurality of groups of pixels, for example, pixels having a "1" value which all have the same height, or all of which have similar heights. In some embodiments, where a barcode has a set number of bars, the controller 350 can identify the ROI by identifying the set number of pixel groupings all of which have the same or similar size within the binarized image data. The controller 350 can identify the groups of pixels having the same or similar heights as the region of interest. The controller 350 can identify heights of pixels where the image is oriented as shown in FIGS. 2A and 2B. The controller 350 can also perform these operations on images or binarized image data which is skewed or differently oriented. In this case, the height of the groups of pixels does not necessarily correspond to a y-axis, a vertical direction, etc.

The controller 350 can further identify the minor axes of the groups of pixels having a "1" value. If the minor axes of the groups of pixels having similar heights are all the same, the controller 350 may not identify those groups as an ROI having a barcode. In some embodiments, if the minor axes of the groups of pixels vary within known parameters, such as relative widths, the controller 350 may identify the groups of pixels as corresponding to bars in a barcode, and can identify the region of interest as including the groups of pixels.

In state 630, the controller 350 may remove a certain area of pixels representing a non-barcode pixel region. The non-barcode pixel region may include the remaining area of the binarized image data excluding the barcode pixel region 510. In some embodiments, the controller 350 may remove the non-barcode pixel region using a pixel mask or an image mask. An image mask is an image the same dimensions as the original image which obscures or removes pixel information from all the image except for the identified ROI or the location where the code is identified. In this way, the operation may restrict to some parts of the image. In some embodiments, the mask can be applied by identifying the location of the groups of pixels which make up the barcode, and applying those pixel locations to the image as it existed before it was converted to binarized image data or binarized. In some embodiments, the image data which does not include the ROI can be removed or deleted, and the resulting image data stored. The controller 350 can then convert all the pixels of the image before binarization to white pixels, or any other desired color. In some embodiments, the controller 350 can crop the image such that the only portion of the image remaining corresponds to the ROI identified in step 620.

In some embodiments, The controller 350 may move the identified barcode pixel region to another memory or another location of the memory 350 which is different from a location of the memory 360 that stores the binarized image data 50. In these embodiments, the controller 350 may not need to remove the non-barcode pixel region.

In state 640, the controller 350 may store or process the identified barcode region, or the masked or cropped image to decode, parse, or read the barcode. In some embodiments, the controller 350 or another processor can perform edge detection on the masked image to identify the beginning and end bars of the barcode, and can use this information to crop down the image to only the barcode portion of the image. According to various embodiments, the item processing can be faster, as the controller 350 can process binarized image data of the region of interest compared to existing methods. Furthermore, the controller 350 can process only the region of interest such as the barcode region compared to processing the entire set of binarized image data of a captured image.

Figure 7:
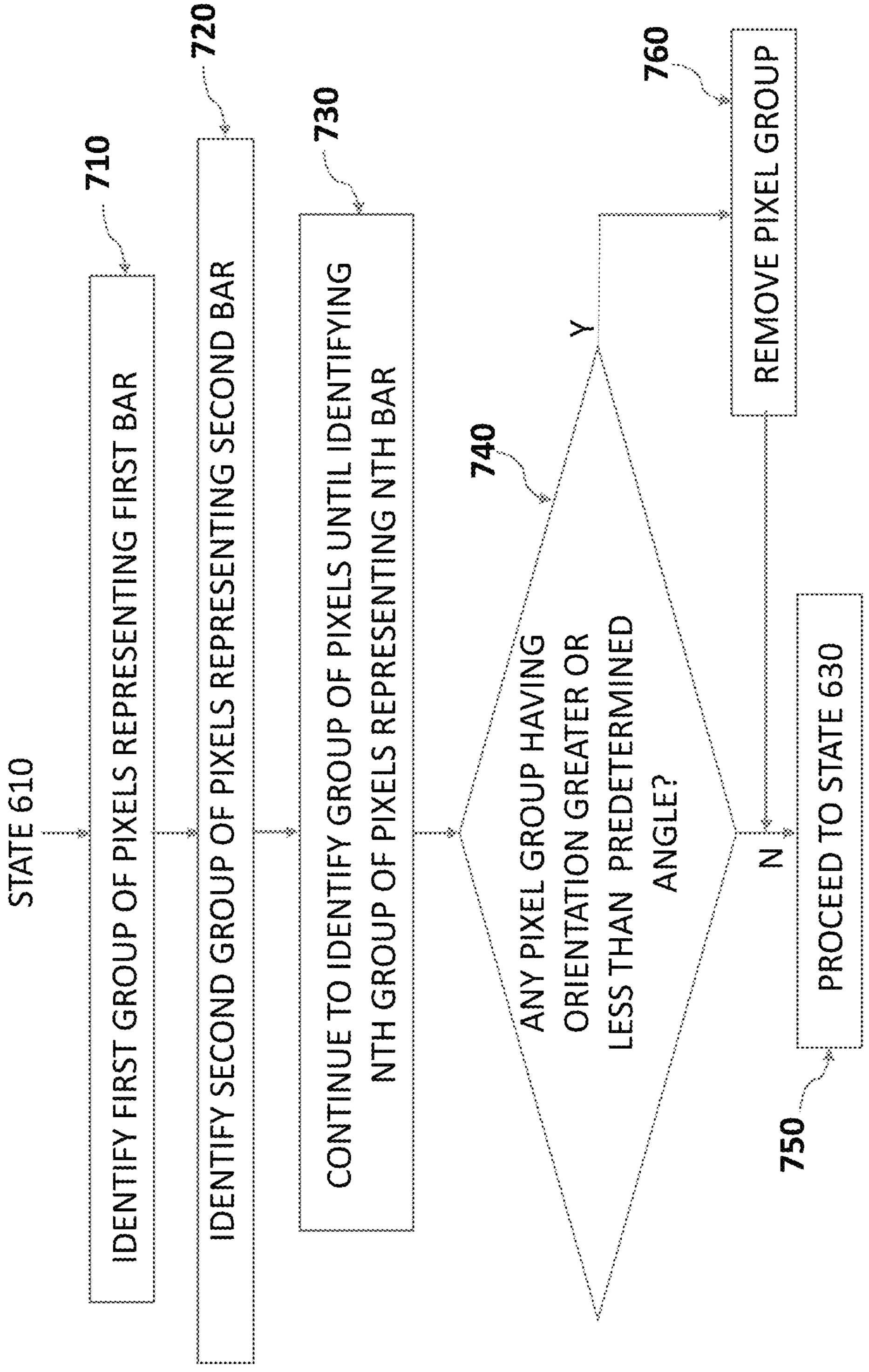
FIG. 7 is a process flow diagram of example detailed states of identifying the barcode region shown in FIG. 6 according to some embodiments.

FIG. 7 is a process flow diagram of state 620 of FIG. 6 which details states of identifying the barcode region or ROI in an image. In state 710, the controller 350 may identify a first group of pixels indicating a first bar from the binarized image data received or retrieved in state 610 as described elsewhere herein. The memory 360 may store the relationship between a barcode and a pixel number for the major axes of the constituent bars and a range of pixel numbers for the minor axes of the bars. The memory 360 may store such relationships for one or more of IMpb, a UPC barcode, an EAN barcode, a Code39 barcode, a Code 128 barcode, an ITF barcode, a Code 93 barcode, a Codabar barcode, a GS1databar barcode, or an MSI Plessey barcode. The controller 350 may identify the first pixel group based on the first bar having a particular pixel number for the major axis and a range of pixel numbers for the minor axis.

In state 720, the controller 350 may identify, from the binarized image data received or retrieved in state 610, a second group of pixels representing a second bar. The controller 350 may similarly identify the second pixel group based on the second bar having a particular pixel number for the major axis and a range of pixel numbers for the minor axis In state 730, the controller 350 may continue to identify a group of pixels until an Nth group of pixels representing an Nth bar of the barcode are identified where N is a natural number greater than 1. The controller 350 may similarly identify a third pixel group up through an Nth pixel group. Given that the major axes of the same barcode will be the same, the first to Nth groups of pixels indicating the first to Nth bars may show similar arrangement of binarized image data with respect to the major axes, for example, as shown in FIG. 5 as the barcode region 510.

In state 740, the controller 350 may determine whether there is any pixel group having an orientation greater than a predetermined angle. When an item is scanned or imaged in the item processing equipment, the item may not be oriented exactly with the x and y axes of the resulting image. This will result in the bars of the barcode being skewed or at an angle relative to a vertical axis or y axis of the image. Relative to each other the bars of a barcode generally have the same orientation, or will all be at the same angle. In some embodiments, the controller 350 may identify a pixel group of the first to Nth pixel groups that looks like (or is initially determined as) a bar. To determine whether the group of pixels is a bar or not, the controller 350 can determine an orientation of the group of pixels, based on a long axis of the group of pixels. If the orientation of an identified group of pixels is not the same as or is not within a range or rotation angle of the other identified groups of pixels corresponding to bars, the controller 350 may determine that it is not a bar, because its orientation being greater than or smaller than a predetermined angle compared to the orientations of the remaining bars. This pixel group may indicate some non-bar text, number, character or handwritten text such as scribbled writing, an artifact in the image, a stray fiber, a stray mark, etc.

In determining the orientations of the remaining bars, the controller 350 may calculate an average orientation of the first to Nth bars and compare the average orientation with the orientation of the identified pixel group. The orientation can be set relative to an x or y axis of the image. In these embodiments, the controller 350 may calculate the difference between the average orientation of the bars and the orientation of the pixel region and determine whether the difference is less than or greater than a predetermined angle. In some embodiments, the predetermined angle may be about 5 degrees or about 5-10 degrees. In some embodiments, the predetermined angle may be less than about 5 degrees or greater than about 5-10 degrees.

Figure 8:
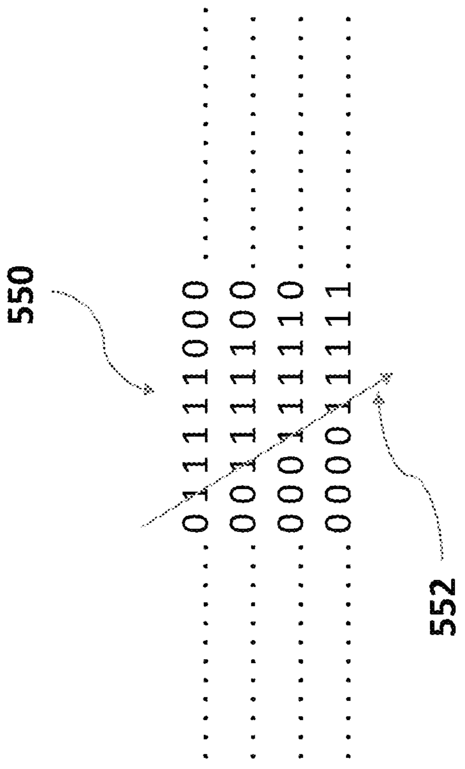
FIG. 8 shows an example set of pixel values having a major axis oriented at a predetermined angle according to some embodiments.

Referring to FIG. 8, an example set of binary values 55 including a group of pixels 550 having a major axis 552 oriented at an angle relative to an x or y axis of an image are shown. In these embodiments, the controller 350 may determine the orientation angle of the major axis of a pixel group based on an arrangement of pixel values (e.g., "1").

If it is determined in state 740 that there is not one or a pixel group having an orientation greater or less than a determined angle for the first, second, etc. bar identified above, the process proceeds to state 630 shown in FIG. 6 (state 750).

If it is determined in state 740 that there is a pixel group having an orientation greater or less than a predetermined angle such as that depicted in FIG. 8, the controller 350 may remove the identified pixel group from the bar pixel region (state 760). If the group of pixels in FIG. 8 is determined to have an angle of orientation within the angle determined for other groups of pixels or bars in the image, then the controller 350 can interpret the group of pixels as another bar or space, etc.

Figure 9:
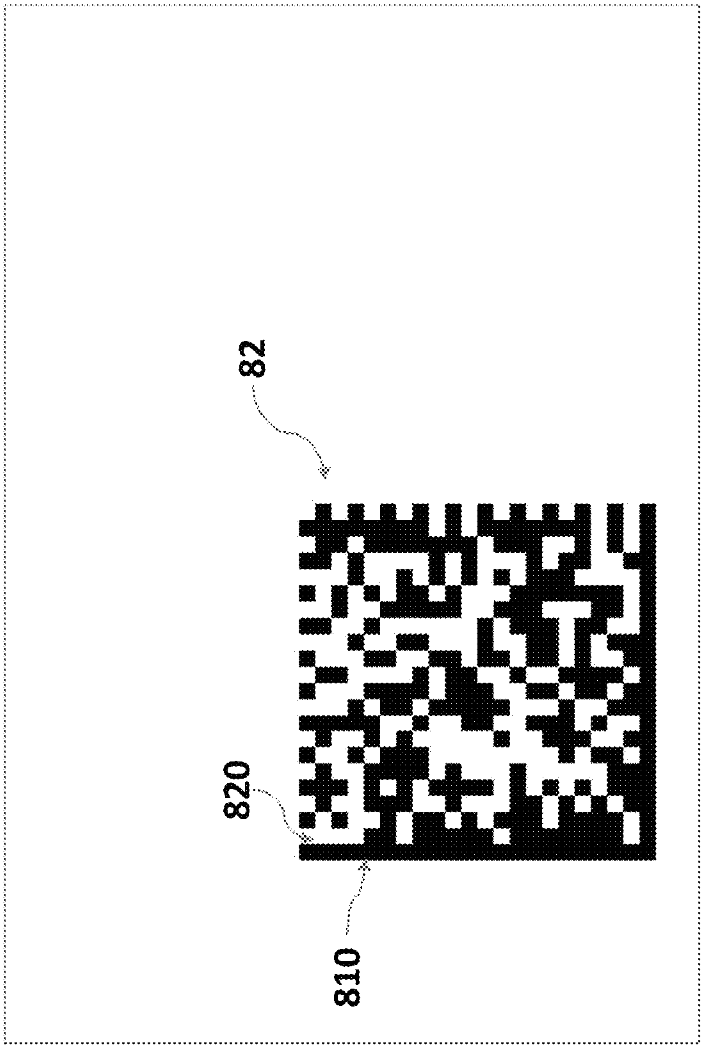
FIG. 9 illustrates an example image showing a label that contains a two dimensional barcode according to some embodiments.
Figure 10:
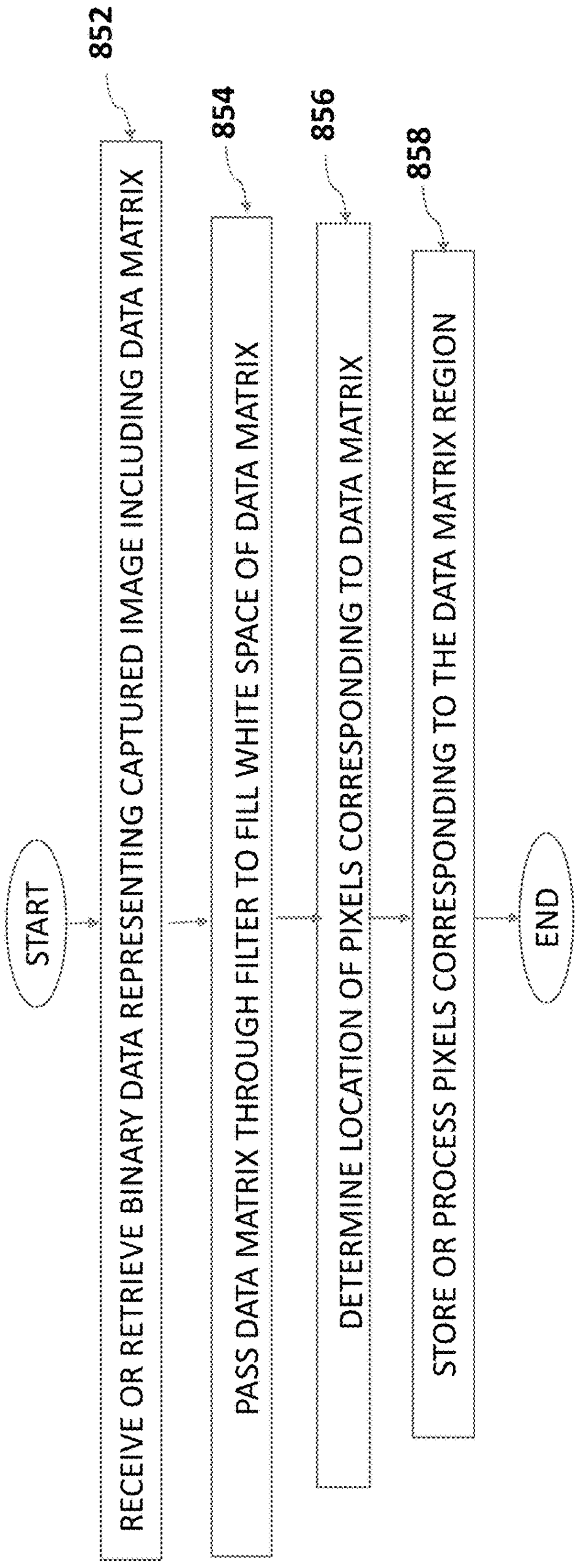
FIG. 10 is a process flow diagram of a method for extracting a region of interest from a captured image of an item or a label according to some embodiments.

FIG. 9 illustrates an example image showing a label 80 that contains a two dimensional barcode (or data matrix) 82 according to some embodiments. The two dimensional barcode 82 may include a black region 810 and a white region 820. The barcode 82 shown in FIG. 9 is merely an example two dimensional barcode having a particular shape, and other two dimensional barcodes having different shapes are also possible. FIG. 10 is a process flow diagram 850 of a method for extracting a region of interest from a captured image of an item according to some embodiments. For the purpose of convenience, the embodiment of FIGS. 9 and 10 will be described based on the controller 350 performing the process flow diagram 850.

In state 852, the controller 350 may receive or retrieve binarized image data representing a captured image of an item or a label including the data matrix 82. In some embodiments, the controller 350 may receive binarized image data from one of the scanners (320, 425 and 435). In these embodiments, the scanners (320, 425 and 435) capture an image of the label and convert the captured image into binarized image data. In some embodiments, the controller 350 may receive an image from the scanners (320, 425 and 435), convert the image into binarized image data and store in the memory 360. In these embodiments, the controller 350 may retrieve the binarized image data from the memory 360. The memory 360 may store the pixel numbers of the horizontal and vertical sides of the data matrix 82.

In state 854, the controller 350 may pass the data matrix 82 through a filter (not shown) in order to fill the white regions 820 of the data matrix 82 with black pixels. The filter may include a convolutional filter. In some embodiments, the white region may have binary values of "0" and the black region may have binary values of "1." After passing the filter, the data matrix 82 may appear as a square filled with black pixels or binary values of "1". In some embodiments, the image can be downsampled to remove granularity or detail in the image. This image can be converted to binary image data, or the downsampling can be performed on the binary image data. This can result in the 2D barcode or matrix appearing as a solid black square or rectangle. The controller 350 may perform edge detection between the outer boundary of the black square of the data matrix 82 and the background area excluding the data matrix 82 in the captured image.

In state 856, the controller 350 may determine the location of a pixel region representing the data matrix 82 in the captured image. Once the controller 350 determines the location of the data matrix 82, the controller 350 may pass the data matrix 82 through another filter (e.g., convolutional filter) inverse to the filter used to fill the white spaces with black bars in state 854, so as to remove the binary values corresponding to the white spaces. In state 858, the controller 350 may store and/or process the pixel region, the portion of the image corresponding to the pixel region, representing the data matrix 82. The pixel region or portion of the image can then be passed to a barcode decoder to read the barcode.

Figure 11:
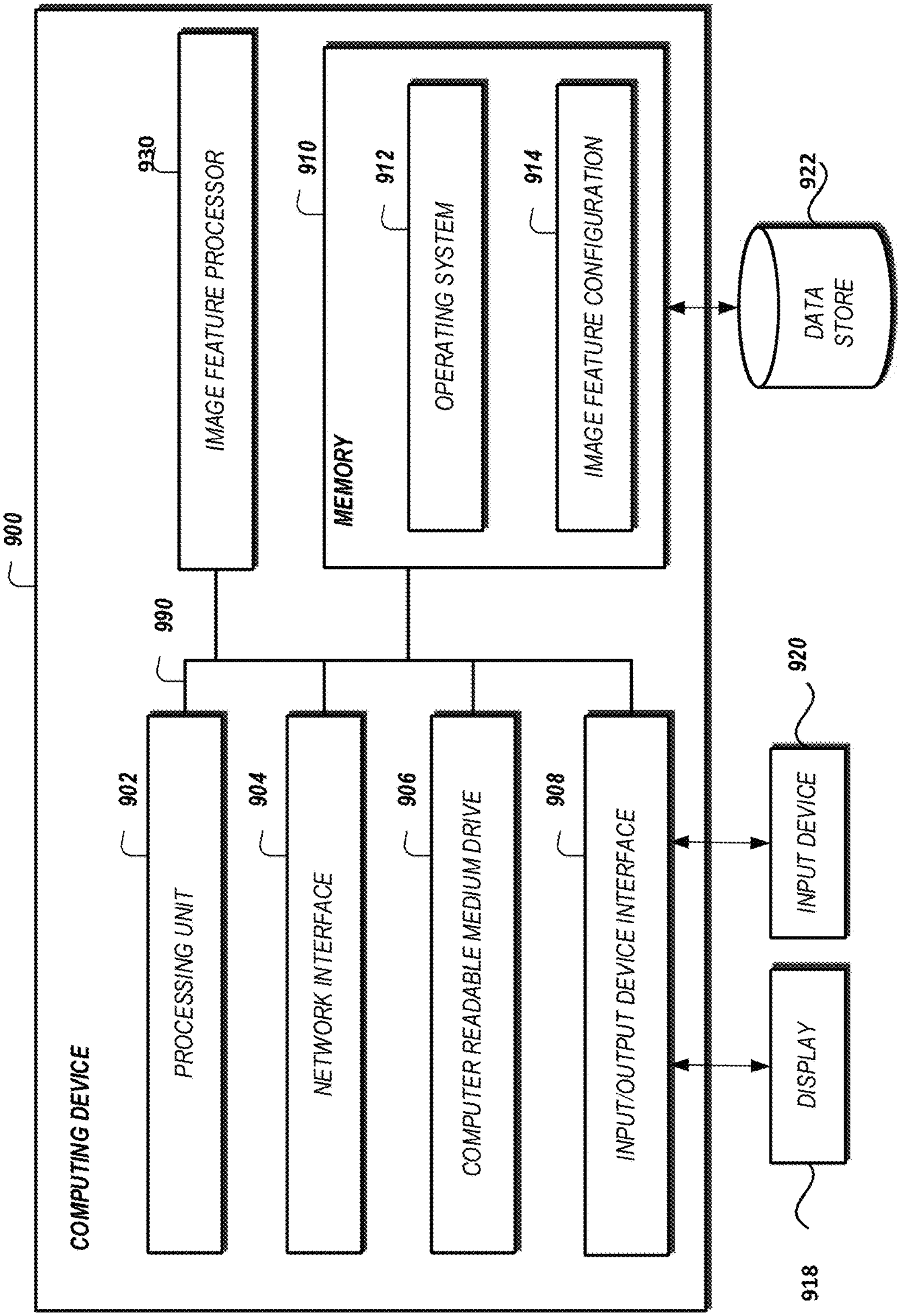
FIG. 11 is a block diagram of an example controller illustrated in FIG. 3 according to some embodiments.

FIG. 11 is a block diagram of an embodiment of a computing device 900 for implementing the process flow diagrams 600, 620 and 850 described above with respect to FIGS. 6, 7 and 10. FIG. 11 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the optical scanners 320/425/435 and the controller 350. In some embodiments, at least some elements of the computing device 900 may be included in one or more of the optical scanners 320/425/435 and the controller 350 to perform an entirety or part of the flow diagrams shown in FIGS. 6, 7 and 10. In still other embodiments, the computing device 900 may be in data communication with one or more of the optical scanners 320/425/435 and the controller 350 to perform an entirety or part of the procedures shown in FIGS. 6, 7 and 10.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 11. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for extracting a region of interest from a captured image of an item, the system comprising:
  one or more processors configured to:
    receive an image of an item;
    pass the captured image of the item through a first filter to generate a modified captured image, wherein the first filter generates an outer boundary of black pixels around a computer readable code region within the captured image with black pixels;
    perform edge detection between the outer boundary of the computer readable code region and a background area excluding the computer readable code region;
    identify the computer readable code region in the modified captured image based on at least on the edge detection of the outer boundary of the computer readable code region;
    pass the modified captured image of the item through a second filter;
    process the computer readable code region to extract data associated with the computer readable code region.

2. The system of claim 1, wherein the first filter and the second filter are convolutional inverses to each other.

3. The system of claim 1, wherein the first filter further downsamples the captured image of the item, wherein downsampling fills one or more white regions of the computer readable code region within the captured image with black pixels.

4. The system of claim 1, wherein the first filter converts the computer readable code region into a solid black shape, wherein the solid black shape has dimensions corresponding to dimensions of the computer readable code region.

5. The system of claim 1, wherein the one or more processors are further configured to binarize the captured image to create digital data.

6. The system of claim 5, wherein the digital data associated with the computer readable code region is stored in memory.

7. The system of claim 6, wherein the memory is further configured to store pixel locations of the computer readable code region.

8. The system of claim 1, wherein the computer readable code region comprises a two-dimensional barcode comprising white spaces and black spaces.

9. The system of claim 8, wherein the two-dimensional barcode is a QR code.

10. A method of extracting a region of interest from a captured image of an item, the method comprising:
  passing the captured image of the item through a first filter to generate a modified captured image, wherein the first filter generates an outer boundary of black pixels around a computer readable code region;
  performing edge detection on the modified captured image between the outer boundary of the computer readable code region and a background area excluding the computer readable code region;

identifying the computer readable code region in the modified captured image based on at least the edge detection of the outer boundary of the computer readable code region;

passing the modified captured image through a second filter; and processing the computer readable code region to extract data associated with the computer readable code region.

11. The method of claim 10, wherein the filter down-samples the captured image of the item.

12. The method of claim 10, wherein the filter converts the computer readable code region into a solid black shape, wherein the solid black shape has identical dimensions to the computer readable code region.

13. The method of claim 10, further comprising binarizing the captured image to create digital data.

14. The method of claim 13, wherein the digital data associated with the computer readable code region is stored in memory.

15. The method of claim 14, wherein the memory is further configured to store pixel numbers of horizontal and vertical sides of the computer readable code region.

16. The method of claim 10, wherein the computer readable code region comprises a two-dimensional barcode comprising white spaces and black spaces.

17. The method of claim 16, wherein the two-dimensional barcode is a QR code.

18. A system for processing an image, the system comprising:

one or more processors, the one or more processors configured to:

receive an image;

binarize the image into digital data;

determine that data values of a first row in the digital data and the data values of a second row in the digital data are similar;

identify a selected region in the digital data, wherein the selected region comprises the first row and the second row; and process the digital data associated with the selected region to extract data associated with the selected region.

19. The system of claim 18 wherein the one or more processors are further configured to store the digital data associated with the selected region in memory.

* * * * *